United States Patent [19]

Hazard et al.

[11] Patent Number: 4,910,773

[45] Date of Patent: Mar. 20, 1990

[54] METHOD OF DISPATCHING SECRET KEYS TO SECURITY MODULES AND USER CARDS IN A DATA PROCESSING NETWORK

[75] Inventors: Michel Hazard, Mareil/Mauldre; Jean-Michel Desjardins, Montigny Le Bretonneux; Francois Chemin, Plaisir, all of France

[73] Assignee: CII Honeywell Bull (Societe Anonyme), Paris, France

[21] Appl. No.: 176,158

[22] Filed: Mar. 31, 1988

[30] Foreign Application Priority Data

Apr. 3, 1987 [FR] France .................................. 87 04729

[51] Int. Cl.$^4$ ............................................. H04L 9/04
[52] U.S. Cl. ....................................... 380/21; 380/25; 380/45
[58] Field of Search ........................ 380/21, 23, 24, 25, 380/45, 49

[56] References Cited

U.S. PATENT DOCUMENTS

| | | | |
|---|---|---|---|
| 4,193,131 | 3/1980 | Lennon et al. ........................ | 380/21 |
| 4,203,166 | 5/1980 | Ehrsam et al. ........................ | 380/25 |
| 4,211,919 | 7/1980 | Ugon ..................................... | 380/23 |
| 4,423,287 | 3/1986 | Zeidler ................................. | 380/24 |
| 4,471,216 | 9/1984 | Herve .................................... | 380/23 |
| 4,500,750 | 2/1985 | Elander et al. ....................... | 380/25 |
| 4,578,530 | 12/1983 | Zeidler ................................. | 380/24 |
| 4,607,137 | 8/1986 | Jansen et al. ......................... | 380/21 |
| 4,633,037 | 12/1986 | Serpell ................................. | 380/21 |
| 4,649,233 | 3/1987 | Bass et al. ............................ | 380/21 |
| 4,694,492 | 9/1987 | Wirstrom et al. .................... | 380/23 |
| 4,731,840 | 3/1988 | Mniszewski et al. ................. | 380/21 |

FOREIGN PATENT DOCUMENTS 0068805  1/1983  European Pat. Off. ............... 380/25
0111381  6/1984  European Pat. Off. .
0123360  10/1984  European Pat. Off. .

OTHER PUBLICATIONS

IBM Technical Disclosure Bulletin, vol. 22, No. 2, Jul., 1979, pp. 629-631, New York, US; C. H. Meyer et al.: "Establishment of User Keys in a Multi-User Network".

IICL Technical Journal, vol. 4, No. 2, Nov. 1984, pp. 146-158, R. W. L. Jones: "User Functions for the Generation and Distribution of Encipherment Keys".

*Primary Examiner*—Salvatore Cangialosi
*Attorney, Agent, or Firm*—Kerkam, Stowell, Kondracki & Clarke

[57] ABSTRACT

The present invention relates to a method for dispatching at least one predetermined secret key, in order to make the implementation of a provision of service secure, characterized in that it comprises transmitting a predetermined implementation key in encoded form from a security module (MSCl) having a predetermined rank to a security module (MST1) or card (U) of a rank lower than the predetermined rank, this encoding comprises using an encoding algorithm and introducing the predetermined implementation key, as well as least one diversified key, this diversified key, necessary for the encoding, being obtained by a diversification algorithm by introducing both a basic key of this diversified key and diversification data originating from the module of lower rank, the predetermined encoded implementation key being decoded by the use, in a module of lower rank than the predetermined rank, of a decoding algorithm which is the inverse of the encoding algorithm.

17 Claims, 3 Drawing Sheets

METHOD OF DISPATCHING SECRET KEYS TO SECURITY MODULES AND USER CARDS IN A DATA PROCESSING NETWORK

BACKGROUND OF THE INVENTION

1. Field of the Invention

The present invention relates to a method of dispatching secret keys to security modules and user cards, in a data processing network.

This invention applies in particular to the introduction and implementation of a new service in an existing secure data processing network. It also enables the user of a card to memorize and process data, for access to a new or existing service in a network.

2. Description of the Prior Art

A network comprises a plurality of processing or data exchange units, such as one or more central processing units, one or more terminals being connected to each central processing unit and capable of communicating with user cards for providing a service. The services provided may, for example, be furnished by a banking organization, a mail marketing organization, and so forth. It is known that in a secure network, each processing unit or exchange unit itself includes a module, known as a security module, which generally includes a microprocessor connected to a monolithic memory. Each security module allows an authorizing organization to load at least one basic secret key into this module. From this basic key and with a suitable diversification algorithm, the security module can calculate at least one diversified key. This security module can in particular, with a suitable program, authenticate a diversified key as having been developed on the basis of a predetermined basic key.

The user card is also designed as a security module.

A security module of this type, as well as the method of diversification of a basic key and authenication of the diversified key obtained are described in French Patent Application No. 86 10416, the subject matter of which is hereby incorporated by reference.

Any security module that belongs to a processing unit or data communication unit or comprises a user card in a network contains a diversified key, when the network functions for a predetermined provision of service. It is known that the diversified and secret keys, which allow different modules of the network to communicate by assuring the aforementioned authentication, are recorded in the various security modules of the network by the manufacturer of these modules or by an authorizing organization, on heavily monitored premises, in order to prevent any defrauder to learn the basic keys and the diversified secret keys calculated from these basic keys.

Thus each security module has a separate secret diversified key of its own, which differs from the diversified secret keys assigned to the other security modules or to the card. These diversified keys permit each security module in the network (the card itself can be considered a security module) to verify that the diversified key recorded in a predetermined module does indeed correspond to the basic secret key which has permission to obtain this diversified secret key. This basic key is recorded in another security module, to which the predetermined module is connected. This authentication mechanism, or mechanism for certification of the diversified keys, is described in the aforementioned French Patent Application No. 86 10416.

The use of a new service in a network, if it does necessitate using these basic secret keys and diversified secret keys respectively obtained from these basic keys, and the practical application of the methods of authenticating the aforementioned diversified keys, also necessitates introducing secret basic keys, called service-implementation keys, into the security modules of the network; these implementation keys are diversified only in the last security module of the network (for example, the user card), thus permitting this last module to gain access to the new service thus introduced in the network.

At the present time, to introduce a new service into an existing secure network it is necessary to send the security modules (including the user cards) of this network back to an authorizing organization under strict security, so that this organization can record the secret implementation keys (diversified in the user card) of this new service into these modules.

As a result, the introduction of a new service is disruptive and complicated, because the security modules of the network must be withdrawn in order to send them back to the authorizing organization and after servicing these modules must be restored or reintroduced in the network. These operations are time-consuming and make the network inoperative while they are being put into place; consequently, they are expensive. Moreover, they present the risk that one or more of the security modules temporarily withdrawn from the network will be lost or destroyed, or even misappropriated by a defrauder for illegal purposes.

SUMMARY OF THE INVENTION

The object of the invention, precisely, is to overcome these disadvantages, in particular to permit the introduction of a new service into an existing network, as well as to permit access to this new service for users, without having to return both the security modules of various modules of this network, and user cards, to an authorizing organization so that the secret implementation keys of this new service in the network can be introduced into these modules and cards.

These objects are attained in particular by using a module for loading implementation keys that is connected to one or more of the security modules of the network. The implementation keys are sent in increments, in encoded form, to the security modules of decreasing rank (for example, the security module of a terminal connected to the central unit, then a user card). These implementation keys are not diversified except in the last security module (in the example selected, the user card). Transmission of the implementation keys from the loading to the other modules of the network, which is done encoded, prevents any fraud during this transmission.

Hence, the invention proposes a method for dispatching at least one predetermined secret key, in order to secure the implementation of a new service, from a security module of a central processing unit (Cl) of a service implementation network to another security module of a terminal of this network, or to user cards that can be connected to the terminal and in turn comprise security modules, characterized in that it comprises transmitting a predetermined implementation key in an encoded form from a security module having a predetermined rank to a security module (terminal or card) having a lower rank than the predetermined rank, this encoding comprising using an encoding algorithm contained in the module of predetermined rank and introducing both the predetermined implementation key and at least one diversified key recorded in the module of a rank lower than the predetermined rank, this diversified key necessary for the encoding being obtained by diversification algorithm contained in the module of predetermined rank and introducing both basic key of this diversified key and diversification data originating in the module of lower rank, the predetermined encoded implementation key being decoded by the use, in the module of lower rank than the predetermined rank, of a decoding algorithm, which is the inverse of the encoding algorithm.

According to another feature of the invention, any diversified key transmitted from a module of predetermined rank to a module of a lower rank for being recorded there is encoded, and the method comprises the use of an encoding algorithm contained in the module of predetermined rank and introducing both the diversified key to be transmitted and another diversified key calculated by the diversification algorithm contained in the module of predetermined rank and recorded in the module of a rank lower than the predetermined rank, the diversified key thus encoded being decoded by an algorithm, contained in the module of lower rank than the predetermined rank, that is the inverse of the encoding algorithm.

In another feature of the invention, the method comprises the use of a loading module, connectable to the module having the highest rank in the network, this module containing basic keys recorded by an authorizing organization, the basic keys corresponding to the predetermined implementation keys to be dispatched, as well as diversified keys serving the purpose of encoded transmission of each predetermined secret implementation key, this loading module containing at least one algorithm for diversification of basic keys and at least one algorithm for encoding basic keys or diversified keys to be transmitted to the modules of the network for the dispatching of implementation keys.

According to another feature of the invention, the diversified keys are prerecorded in the module and in the cards, respectively, by an authorizing organization prior to the use of the modules and cards in the network.

In another feature of the invention, the method comprises encoding, by an encoding algorithm contained in the loading module, a first predetermined basic key for implementation of the service recorded in this loading module, this first encoded key being transmitted from the loading module to the security module of the central unit, where it is decoded by an inverse algorithm of the encoding algorithm, this first key being re-encoded by an encoding algorithm contained in the security module of the central unit for being transmitted to the security module of the terminal, where it is decoded by an inverse algorithm of the encoding algorithm, this first key being diversified and encoded in the central unit security module by diversification and encoding algorithms contained in the module of the central unit, in order to be transmitted to the user card, where it is decoded by an inverse algorithm of the encoding algorithm.

In another feature of the invention, the encoding algorithm of the first implementation key transmitted from the loading module to the security module of the central unit introduces both the basic key of this first key and a first diversified transport key, obtained by a diversification algorithm contained in the loading module and introducing both a basic key of this first transport key contained in the loading module and diversification data originating in the security module of the central unit.

In another feature of the invention, the encoding algorithm of the first encoded key transmitted from the security module of the central unit to the security module of the terminal introduces both the first key, contained in the security module of the central unit, and a diversified communication key recorded in the security module of the terminal and calculated in a security module of the central unit, by a diversification algorithm introducing both the basic key of this diversified communication key recorded in the security module of the central unit and diversification data originating in the security module of the terminal.

In another feature of the invention, the basic communication key recorded in the security module of the central unit is transmitted in encoded form from the loading module to the security module of the central unit, the encoding of this communication key using an encoding algorithm contained in the loading module and introducing both the basic key contained in the loading module and the first diversified transport key calculated in the loading module, the diversified communication key to be recorded in the security module of the terminal being transmitted from the loading module to the security module of the terminal, in a diversified and encoded form, the diversification of this key using a diversification algorithm from the loading module introducing both the basic communication key contained in the loading module and diversification data originating in the security module of the terminal, the encoding of this diversified communication key using an encoding algorithm that introduces both the diversified communication key, and a second diversified transport key obtained by a diversification algorithm that is contained in the loading module and introduces both the basic key of this second transport key contained in the loading module and diversification data originating in the security module of the terminal.

In another feature of the invention, the diversification algorithm contained in the security module of the central unit for diversification of an implementation key to be transmitted to the user card introduces both the basic key of this implementation key, contained in this security module, and diversification data originating in the user card, the encoding of the diversified implementation key being obtained by an algorithm, contained in the security module of the central unit, that introduces both the diversified implementation key and a diversified opening key which is recorded in the user card and is calculated in the security module of the central unit by a diversification algorithm that introduces both a basic key of this opening key, recorded in the security module of the central unit, and diversification originating in the user card.

In another feature of the invention, the basic opening key recorded in the security module of the central unit is transmitted in encoded form by the loading module, the encoding of this basic key being obtained by an encoding algorithm contained in the loading module, and using said first diversified transport key.

In another feature of the invention, the diversified opening key recorded in the user card is transmitted to the user card in encoded form by the security module of the central unit, the encoding of this diversified opening key using an encoding algorithm contained in the security module of the central unit and introducing both this diversified opening key and a diversified fabrication key prerecorded in the card and calculated by the security module based on a basic fabrication key.

In another feature of the invention, the basic key of the diversified fabrication keys prerecorded in the user cards is transmitted to the security module of the central unit in encoded form, the loading module containing an encoding algorithm introducing both this basic key of the prerecorded diversified keys and the first transport key calculated by the loading module and present in this security module of the central unit.

In another feature of the invention, the first and second diversified transport keys are recorded in the security module of the central unit and in the security module of the terminal, respectively.

BRIEF DESCRIPTION OF THE DRAWINGS

The characteristics and advantages of the invention will become more apparent from the ensuing description, taken in conjunction with the drawings, in which.

DESCRIPTION OF THE PREFERRED EMBODIMENTS

Figure 1:
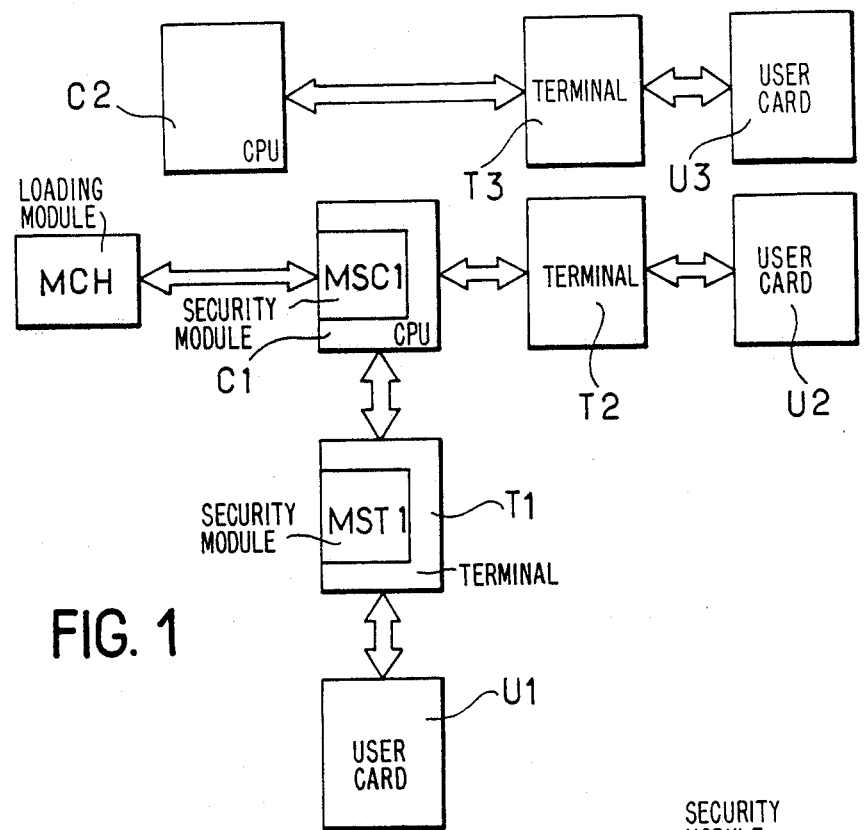
FIG. 1, schematically and by way of example, shows a network in which the method according to the invention is applied.

The network shown as an example in FIG. 1 includes, for example, in a data processing system, a central processing unit C1 connected to terminals T1, T2, to which user cards such as U1 or U2 can be connected. Naturally the processing system can include one or more other central processing units such as C2, other terminals such as T3, and other user cards such as U3, which do not belong to the network in question in the present example of an application of the method of the invention, but may possibly be added to it.

In a known manner, the terminal T1 includes a security module MST1, which will not be described here in detail, and which in particular includes a memory and processing circuits, such as a microprocessor, in monolithic form. This security module makes it possible to record secret keys, permitting the identification of the user card, for example, by suitable algorithms; this module also makes it possible, by encoding algorithms, to encode data furnished to the card U1, or to the central unit C1. These algorithms are also reversible, to enable decoding the data or keys which originate in the central unit C1 or a terminal T2 or a card U1 in the same manner. One type of monolithic microprocessor used may be that described in French Patent Application 2 536 880, the subject matter of which is hereby incorporated by reference.

The central unit C1 also has a security module e, the function and structure of which are comparable to those of the security module MST1 of the terminal T1. The data circulating between the terminal T1 and the card U1 are encoded; the same is true for the data circulating between the terminal T1 and the central unit Cl, which are encoded by suitable reversible algorithms. This security module in particular contains diversification and encoding algorithms for keys transmitted to the security module MST1 from the terminal or to the card U1.

The user card (U1 or U2 in FIG. 1) has memorizing and processing functions, and likewise comprises a security module comparable to that of the central unit.

It is assumed that in a network, a central unit, in this case C1 and its associated security module MSC1, have the highest rank in the network, as a function of the processing power of this unit. The terminals and their associated security modules have lower ranks than the predetermined rank of the central unit; these lower ranks are in turn higher than the ranks of the cards, which are the lowest in the network. When the network is used for a predetermined provision of service, service provision keys are recorded in the security modules of the central unit, and some are recorded in the terminal in question. These keys are diversified in the user card and permit this user to gain access to the predetermined service, by connecting the card to the terminal, after at least one diversified key of the provider has been recorded in this card.

From the above, it be appreciated that the references to "rank" relate to a hierarchy between the different elements, such references to rank being commonly used with respect to a hierarchial key management technique. As will be readily understood, "keys" refer to particular types of data words in a data processing network such as data words which allow a particular operation to be performed.

As noted above, in prior art systems, when the user of a card desires to gain access to a new service which was not foreseen at the time the card was issued to him, the user must return the card to an authorizing center so that the center can introduce the diversified service provision key or keys corresponding to the desired service provision into this card. The authorizing center, after introducing these diversified keys into the card, returns the card to the user, who may now use it for this new service, but only after having been deprived of his card and incurring the aforementioned risks. The security modules of the central unit and of the terminal must also be returned to the authorizing center to be loaded with these service provision keys corresponding to a new service to be provided, offered in the network, if this service has not previously been introduced into this network.

According to the method of the invention, it is no longer necessary, when it is desired to introduce a new service into an existing network, to return the security modules of this network, as well as the cards of users desiring to benefit from this service, to an authorizing center that records secret service provision keys into these modules and cards. When the service provision already exists in the network, it is not necessary to return the cards for which access to this service is desired to an authorizing center.

The method of the invention will now be described in detail, assuming that it is desired to introduce a new service in a network not heretofore provided, and that it is also desired to give access to this new service to user cards for which this access was not foreseen.

The method of the invention comprises using a module MCH for loading keys, connected to the security module MSC1 of the central unit Cl of the network in question. This loading module contains the basic keys necessary to implement the method. These keys are loaded in this module by the authorizing organization. The module MCH makes it possible to load at least one service provision key CP into the security module of the central unit, this key being recorded in diversified form CPd solely in the security module having ther lowest rank in the network (for example, the user card).

The service provision key CP which is furnished by the loading module MCH is transmitted from this loading module to the security module E of the central unit Cl, and then to the security module MST1 of the terminal in encoded form via diversified transport keys (CTd1, CXd). It is transmitted in diversified form and then encoded by another transport key also diversified (COd) from the security module of the central unit to the user card.

The result CPc1 of encoding of the service provision key CP, for its transmission from the loading module MCH to the security module MSC1 of the central unit, in particular uses a diversified transport key CTd1 that establishes the rank in communication between the two modules MCH and MCS1. The results CPc2 of encoding of the key CP, for its transmission from the security module MSC1 of the central unit to the security module MST1 of the terminal in particular uses a diversified communication key CXd that establishes another rank in communication between the two modules MSC1, MST1. The key CP is diversified and encoded as CPdc to be transmitted from the security module MSC1 of the central unit to the user card U1. This encoding in particular uses a diversified key for opening the provision of service, COd. Diversification and encoding of the various keys uses specific algorithms which will be described hereinafter in detail.

The diversified transport keys CTd1 and CTd2 correspond to at least one basic key CT contained in the loading module. CTd2 is the diversified transport key that established the rank in communication between the loading modules MCH and the terminal MST1. In the same manner, the diversified communication keys CXd and opening keys COd correspond respectively to basic keys CX, CO which are contained in the loading module and are loaded into this module by the authorizing organization, in the required secure environment.

The figures that follow enable better understanding of the implementation of the method of the invention, and in particular of the various operations of loading of keys performed based on the loading module MCH, as well as the transfer, encoding and diversification operations performed in the course of this implementation.

To set up ranked communication means, these operations include the following:

An initializing step enabling the setup of communication means CT between the loading module MCH, on the one hand, and security modules MSC, MST of central units C or terminals T. An installation step of communication means CX between the security modules MSC of central units and MST of terminals. Another installation step for communication means via an opening key CO between the security modules of central units MSC and user cards. Consequently, these means will be used in order to set up a provision in the network by the secure insertion of at least one basic service provision key CP.

Figure 2:
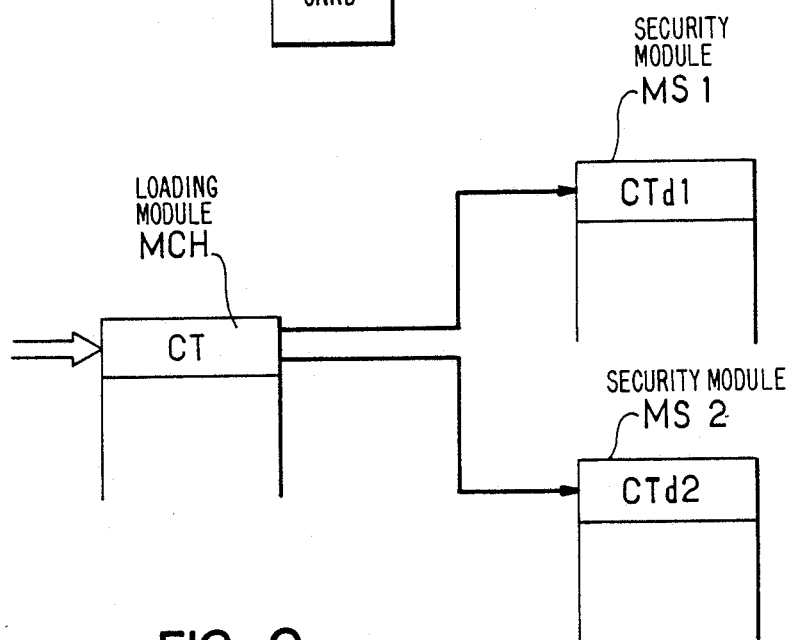
FIG. 2 schematically shows the operations of preloading of a diversified transport key assuring communication between a loading module MCH and security modules which will later be assigned to the network.

FIG. 2 schematically shows the loading of diversified transport keys CTd1 and CTd2 from the initializing step, which are loaded by the authorizing organization, into the security modules, beginning at a basic transport key CT contained in the loading module MCH. The diversified keys are loaded into the security modules prior to the setup in the network. Each arrow into the loading module MCH represents the introduction, in the clear, of keys that they point to. The arrows emerge from the loading module or from other modules represent the encoded transmission of keys, optionally diversified, located facing these arrows.

The diversified transport keys CTd1 and CTd2 are obtained by the use of a diversification algorithm fA contained in the loading module MCH. In a known manner, this algorithm introduces both the basic transport key CT, contained in the loading module, and diversification data originating in the security modules MS1, MS2, which later will be capable of being assigned to a central unit or a terminal. These diversification data are naturally furnished to the loading module. The diversification algorithm is for example of the type described in the aforementioned French Patent Application No. 86 10416.

As a result, the following statements can be made:
CTd1=fA (CT, diversification data of MS1), and
CTd2=fA (CT, diversification data of MS2).

The diversified transport keys CTd1 and CTd2, thus recorded respectively in the security modules MS1, MS2, will as will become apparent hereinafter in detail, enable establishing secure transmission of encoded keys between the loading module MCH and the security modules MS1 and MS2.

Figure 3:
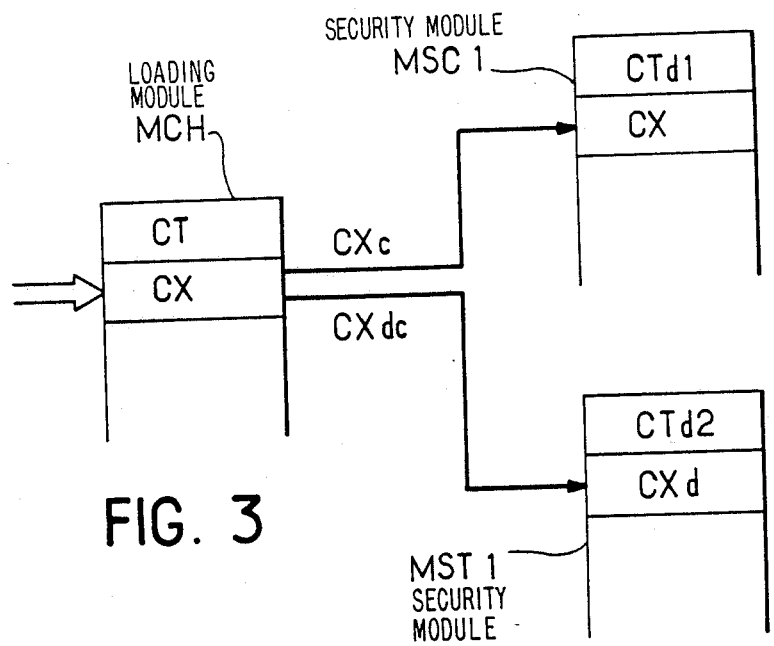
FIG. 3 schematically shows the operations of preloading into a module of the network of a communication key CX, diversified as CXd, in another module for the transfer of implementation keys for a provision of service, from one module to the other.

The following step, which is shown in FIG. 3, comprises ranking the various security modules with respect to one another as a function of their destination, the central units or the terminals, by recording in them ranked communication keys, which will permit or prevent communication depending on whether they do or do not have corresponding keys.

From then on, a module MS1 assigned to a central unit Cl will become a security module of the central unit MSC1 and similarly a module MS2 assigned to a terminal T1 will become a security module of the terminal MST1. These objects are attained because of the introduction of the basic key CX, known as a ranked basic communication key, into the loading module MCH.

The key CX is recorded in nondiversified form in the security module MSC1. Its transmission between MCH and E is executed in encoded form (CXc in FIG. 3). The encoding of the key CX is obtained based on an encoding algorithm fA of the loading module, which introduces both the key CX and the diversified transport key CTd1, which is calculated beforehand by the loading module.

Thus it can be stated that:
CTd1=fA (CT, diversification data of MSC1), and
CXc=fA (CTd1, CX).

The key CXc is decoded (CX) by the security module E by the use of an algorithm that is the inverse of the encoding algorithm, since this module already contains the diversified transport key CTd1. Naturally the algorithm fA for encoding the key CX may be different from the algorithm fA for diversification of the key CT.

The key CX is recorded in diversified form (CXd) in the security module MST1 of the terminal. This key CXd is obtained based on the communication key CX of the module MCH. It is transmitted in diversified and encoded form (CXdc) from the module MCH to the module MSC1.

The diversification (CXd) of the key CX is obtained by the use of a diversification algorithm fB of the loading module MCH which introduces both the key CX and diversification data originating in the security module MST1 of the terminal.

Thus it can be stated that:
CXd=fB (CX, diversification data of MST1).

The ranking is thus established between the modules E and MST1 by the keys CX and CXd, but each key CX, CXd has been furnished by the loading module MCH.

The encoding (CXdc) of the key CXd for transmission of this diversified communication key between the loading module MCH and the security module MST1 is obtained by using an encoding algorithm fA, which is contained in the loading module MCH and which introduces both the diversified transport key CTd2 and the diversified key CXd calculated in the loading module MCH.

Hence, the loading module calculates the following:
CTd2=fA (CT, diversification data of MST1),
hence CXdc=fA (CTd2, CXd).

The diversified and encoded key CXdc is decoded (CXd) in the security module MST1, by an inverse algorithm of the encoding algorithm, this module already containing the diversified transport key CTd2. In the case where one or more central unit security modules MSC1 are authorized to furnish new services to users who hold cards U1 in the network, opening keys CO must be introduceed in these modules MSC1 permitting the establishment of a ranked mean of communication between the modules MSC1 of the service provider and the user cards U1.

To do so, an opening key CO must be installed in each central module MSC1, and at least one diversified opening key COd must be installed in the cards in a phase prior to the time that each card is put into service. This prior phase may be executed independently of the phase of securing the network, which corresponds to the installation in the network of the keys CT, CX and CO and preferably may be performed outside the implementation network.

Figure 6:
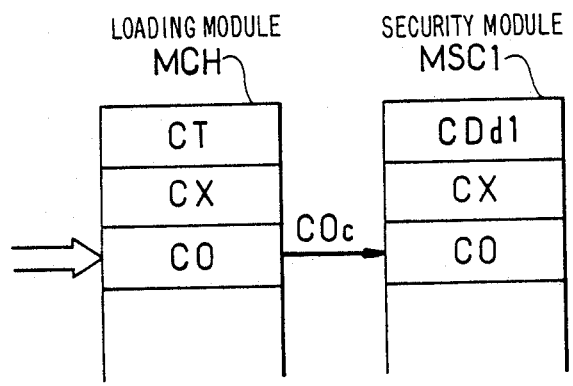
FIG. 6 schematically shows the operations of loading an opening key CO into the security modules, which will be assigned to central processing units MSC1 from a loading module MCH.

The installation of the CO key is performed in the following manner:

The key CO loaded by the authorizing organization in the loading module MCH is transmitted as shown in FIG. 6 in encoded form (COc) to the security module MSC1 of the central unit. This encoding is accomplished by an encoding algorithm fA contained in the loading module MCH, which introduces both the diversified transport key CTd1 contained in the security module MSC1, and the key CO. To do so, the loading module calculates the following, as indicated above:
CTd1=fA (CT, diversification data of MSC1), hence
COc=fA (CTd1, CO).

The key COc is decoded (CO) by an inverse algorithm in the security module E, since the diversified transport key CTd1 is already recorded in this module.

Figure 7:
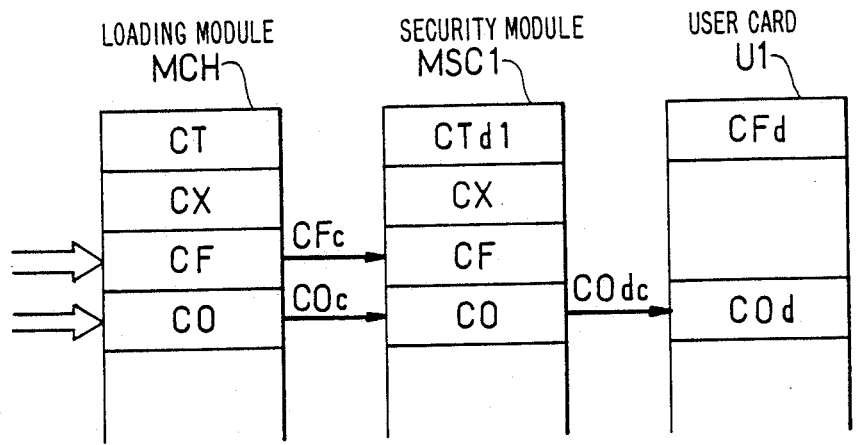
FIG. 7 schematically shows the operations of loading of the diversified opening key CO into a module (card) of the lowest rank (card), with the aid of a fabrication key CF prerecorded in the card in diversified form and loaded into the module MSC1 by the loading module to assure the encoding of the opening key to be transmitted in its diversified form.

The prior installation of the diversified opening key COd into the cards is performed in the following manner:

The diversified opening key COd is recorded in the user card U1, and its transfer from the central unit module MSC1 to the card U1 is performed in encoded form COdc as shown in FIG. 7.

The module MSC1 of FIG. 7 is a security module of the central unit, which can either be used solely for the prior loading, or can be used later as a central module of the network.

The encoding COdc of the diversified opening key COd is assured by an encoding algorithm fB contained in the module MSC1, which introduces both the diversified key COd and a diversified key CFd, called the fabrication key, already recorded in the card at its manufacture; this key CFd identifies the card.

It can then be stated that COdc =fB (COd, CFd).

COd is calculated by the central unit security module MSC1 by using the opening key CO, by the following formula:
COd=fB (CO, diversification data of U1).

This necessitates the prior calculation of the key CFd by the module MSC1. To this end, the basic fabrication key CF, introduced by the authorizing organization into the loading module MCH, is transferred in an encoded form CFc to the central unit security module MSC1. This encoding of the key CF is obtained by using an algorithm fA of the loading module, which introduces both the key CF and the diversified transport key CTd.

The loading module then calculates, first:
CTd1=fA (CT, diversification data of MSC1), then
CFc=fA (CTd1, CF).

This encoded key transmitted to the module E is decoded by an inverse algorithm, since MSC1 already contains the diversified transport key CTd1.

The module MSC1 can then calculate, by the diversification algorithm fB, the diversified fabrication key CFd, this algorithm introducing both the basic key CF, contained in the security module MSC1, and diversification data originating in the card U1.

The following can be written:
CFd=fB (CF, diversification data of U1).

After this last calculation, the diversified and encoded key COdc=fB (COd, CFd) can be calculated as indicated above by the module MSC1; this key is transferred to the card U1, where it is decoded (COd), because the card already contains the key CFd, having been assigned it upon manufacture. Naturally the algorithm fB for diversification of the keys CX and CF can be different from the algorithm fB for encoding the keys CF and COd.

It is readily apparent that in the case where it is not selected to load the diversified opening keys COd into the cards beforehand, but rather to load them via the installed network, then one would begin by installing the key CF, then the key CO and the diversified key COd, via the central unit security module of the network, MSC1. In this case, a diversified fabrication key CFd is introduced beforehand into the card.

Figure 4:
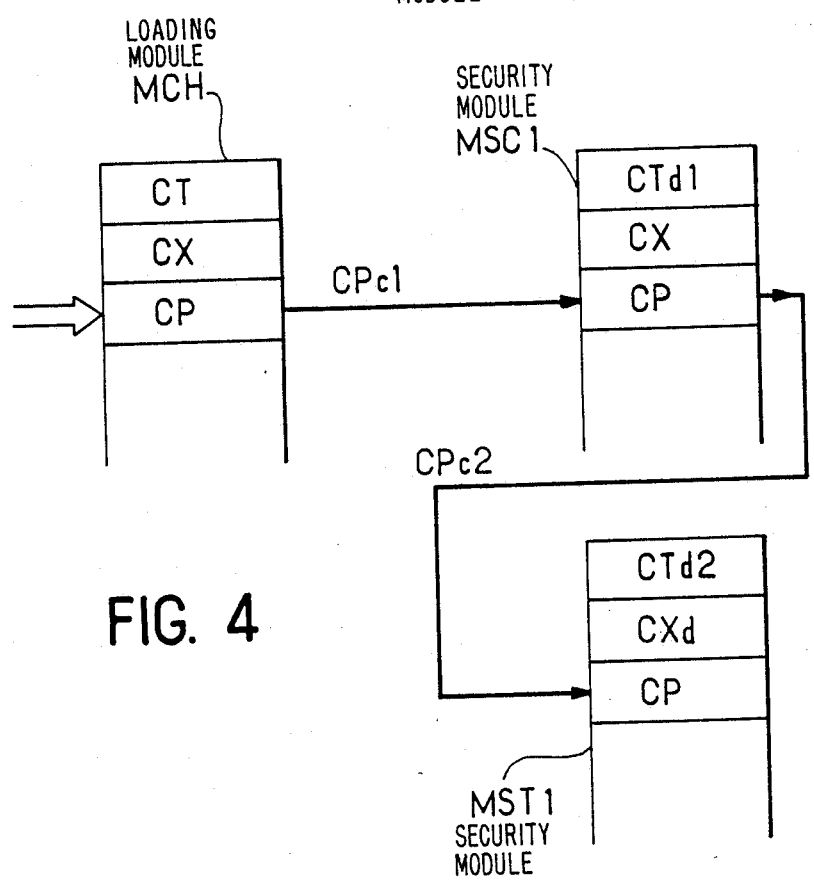
FIG. 4 schematically shows the operations of loading a provision of service key CP into the modules of the network.

The ensuing step shown in FIG. 4 comprises introducing a new service in the network thus installed, which includes the security modules MSC1 and MST1, and for which the preceding steps have made communication possible between the loading module MCH and the security module MSC1 or MST1, and between the security module MSC1 of the central unit and the security module MST1 of the terminal.

This insertion of a new service comprises using at least one service provision key CP recorded beforehand in the loading module MCH by an authorizing organization. As will be seen, this key can be transmitted to the modules MSC1 and MST1. It will then be recorded is diversified form CPd in the user card U1, which will from that time on have access to this service.

The service provision key CP is transmitted in encoded form (CPc1) to the security module MSC1.

The encoding of the key CP is obtained by an algorithm fA of the loading module MCH introducing both the diversified transport key CTd1, calculated by MCH on the basis of diversification data furnished by MSC1, and the key CP. To do so, the loading module first calculates the diversified transport key CTd1:

CTd1=fA (CT, diversification data of MSC1), then calculates:

CPc1=fA (CTd1, CP).

The encoded key CPc1, received by the security module MSC1, is decoded by an inverse algorithm, since this module already contains the diversified key CTd1.

Then, the service provision key CP is transmitted in encoded form (CPc2) from the central unit security module MSC1 to the terminal security module MST1. This encoding is obtained by an encoding algorithm fB contained in the security module MSC1 and introduces both the diversified communication key CXd, calculated by MSC1 on the basis of diversification data furnished by MST1, and the key CP. Hence the security module MSC1 calculates the following:

CXd=fB (CX, diversification data of MST1), then CPc2 32 fB (CXd, CP).

Naturally, an inverse algorithm contained in the security module MST1 enables deduction of CP from CPc2, since this module already contains the diversified communication key CXd. It is apparent that any transmission of a key requires that the person or organization intended by the sender to receive it be authenticated beforehand. This authentication is known, for example, from the aforementioned French Patent Application No. 86 10416.

At the end of this operation, the new service to be provided can be considered now to have been introduced in a network including a single central unit and a single terminal, but one would proceed in identical fashion in the case of a network having one central unit and a plurality of terminals, or a plurality of ranked central units each having a plurality of terminals. Contrarily, at this stage, the user card has not yet been given access to this provision.

Figure 5:
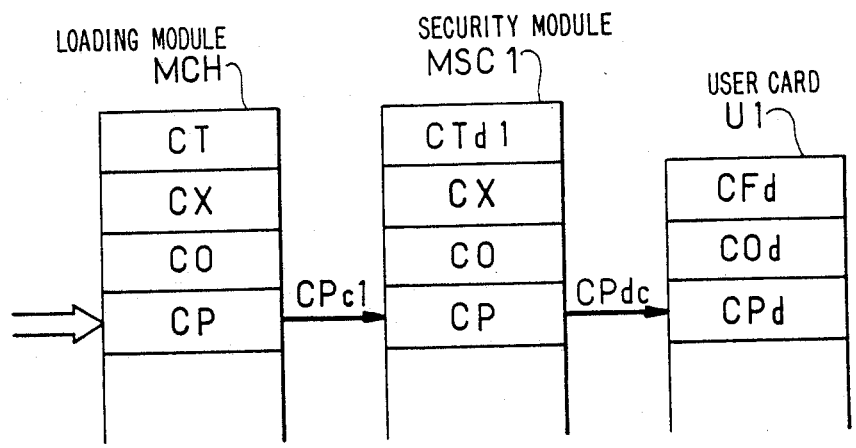
FIG. 5 schematically shows the operations of loading and diversification of a key CPd for provision of service, in the module of the network that has the lowest rank (for example, the user card)

The following operation, represented in FIG. 5, comprises furnishing the user card U1 with the keys necessary for its implementation in the network for the provision of service in question, and in particular the diversified key CPd issuing from the key CP.

To this end, the communication means inaugurated by the opening key CO and its diversified keys COd dedicated to the user card U1. The encoded transmission (CPdc) of the diversified service provision key CPd from the central unit security module MSC1 to the user card U1 does not proceed via the security module MST1 of the terminal, to increase security. In this operation, the security module MST1 of the terminal is transparent, since the card is connected to the terminal and the module MST1 does not intervene.

The service provision key CP is then recorded in the user card U1 in diversified form (CPd), as shown in FIG. 5.

As indicated above, the key CP is recorded in the loading module MCH by the authorizing organization. It is then transmitted to the security module MSC1 of the central unit in encoded form (CPc1), where it is decoded (CP) and then recorded in its nonencoded form (CP).

The key CP will then be diversified and encoded (CPdc) for transmission from the security module MSC1 to the user card U1, where it is decoded (CPd) and recorded.

The diversification (CPd) of the key CP is obtained by an algorithm fB of the security module MSC1, which introduces the key CP, and the diversification data originating in the user card U1.

The following can then be written:

CPd=fB (CP, diversification data of U1).

This algorithm fB may be different from the aforementioned algorithms fB.

The encoding (CPdc) of the key CPd is obtained by an algorithm fB of the security module, which introduces the diversified opening key COd, and the diversified service provision key CPd, calculated as indicated above.

The diversified opening key COd is obtained by a diversification algorithm fB of the central unit security module MSC1.

This algorithm introduces the basic opening key CO, furnished by the loading module, and the diversification data furnished by the user card U1.

It can then be stated that:

COd=fB (CO, diversification data of U1), and then CPdc=fB (COd, CPd).

This diversified and encoded service provision key CPdc can be decoded in the card by an inverse algorithm of the encoding algorithm, since the card now contains the diversified opening key COd.

From now on, the owner of the card can take advantage of the new service to be provided.

In the description of the invention, it may be considered that the security module MSC1 of the network already contains the key to the service provision desired, and that the method thus comprises giving card access to this already installed provision of service. The method would then comprise solely transmitting the key CPd to the card, naturally using the keys necessary for this transmission.

In the description of the invention, a destinction has been made between the algorithm fA, on the one hand, which is an algorithm specific to the transport function and which must be located in the modules MSC, MCH, MST, and the algorithm fB, on the other, which is specific to the application contained in the "user" cards used by the system.

Nevertheless, it will be appreciated that one and the same algorithm can be used for implementing the invention, or that each key and/or each encoding and diversification function can be assigned a different algorithm which in that case would have to be available in the modules where it would be required.

Further modifications within the competence of one skilled in the art are also part of the spirit and scope of the invention.

We claim:

1. A method for dispatching at least one predetermined secret key, in order to secure the implementation of a provision of service, from a security module (MSC1) of a central processing unit (CI) of a service implementation network to another security module (MST1) of a terminal (T1) of this network, or to one of the user cards (U1) that can be connected to the terminal (T1) and in turn comprise security modules, characterized in that it comprises transmitting a predetermined implementation key in an encoded form from a security module (MSC1) having a predetermined rank to a security module (MST1 or card U) having a lower rank than the predetermined rank, this encoding comprising using an encoding algorithm contained in the module of predetermined rank and introducing both the predetermined implementation key and at least one diversified key recorded in the module of a rank lower than the predetermined rank, this diversified key necessary for the encoding being obtained by a diversification algorithm contained in the module of predetermined rank and introducing both a basic key of this diversified key and diversification data originating in the module of lower rank, the predetermined encoded implementation key being decoded by the use, in the module of lower rank than the predetermined rank, of a decoding algorithm, which is the inverse of the encoding algorithm.

2. A method as defined by claim 1, characterized in that any diversified key transmitted from a module of predetermined rank to a module of a lower rank for being recorded there is encoded, the method comprising the use of an encoding algorithm contained in the module of predetermined rank and introducing both the diversified key to be transmitted and another diversified key calculated by the diversification algorithm contained in the module of predetermined rank and recorded in the module of a rank lower than the predetermined rank, the diversified key thus encoded being decoded by an algorithm, contained in the module of lower rank than the predetermined rank, that is the inverse of the encoding algorithm.

3. A method as defined by claim 2, characterized in that it comprises the use of a loading module, connectable to the module having the highest rank in the network, this module containing basic keys recorded by an authorizing organization, the basic keys corresponding to the predetermined implementation keys to be dispatched, as well as diversified keys serving the purpose of encoded transmission of each predetermined secret implementation key, this loading module containing at least one algorithm for diversification of basic keys and at least one algorithm for encoding basic keys or diversified keys to be transmitted to the modules of the network for the dispatching of implementation keys.

4. A method as defined by claim 3, characterized in that the diversified keys are prerecorded in the module and in the cards, respectively, by an authorizing organization prior to the use of the modules and cards in the network.

5. A method as defined by claim 4, characterized in that it comprises encoding (CPc1), by an encoding algorithm contained in the loading module (MCH), a first predetermined basic key (CP) for implementation of the provision of service recorded in this loading module, this first encoded key (CPc1) being transmitted from the loading module (MCH) to the security module (MSC1) of the central unit, where it is decoded (CP) by an inverse algorithm of the encoding algorithm, this first key (CP) being re-encoded (CPc2) by an encoding algorithm contained in the security module (MSC1) of the central unit for being transmitted to the security module (MST1) of the terminal, where it is decoded by an inverse algorithm of the encoding algorithm, this first key being diversified and encoded (CPdc) in the central unit security module by diversification (CPd) and encoding (CPdc) algorithms contained in the module of the central unit, in order to be transmitted to the user card, where it is decoded by an inverse algorithm of the encoding algorithm.

6. A method as defined by claim 5, characterized in that the encoding algorithm of the first implementation key (Pc1) transmitted from the loading module (MCH) to the security module (MSC1) of the central unit introduces both the basic key (CP) of this first key and a first diversified transport key (CTd), obtained by a diversification algorithm contained in the loading module and introducing both a basic key (CT) of this first transport key contained in the loading module and diversification data originating in the security module (MSC1) of the central unit.

7. A method as defined by claim 5, characterized in that the encoding algorithm of the first encoded key (CPc2 transmitted from the security module (MSC1) of the central unit to the security module (MST) of the terminal introduces both the first key (CP), contained in the security module (MSC1) of the central unit, and a diversified communication key (CXd) recorded in the security module (MSC1) of the terminal and calculated in a security module of the central unit, by diversification algorithm introducing both the basic key (CX) of this diversified communication key recorded in the security module (MSC1) of the central unit and diversification data originating in the security module (MST1) of the terminal.

8. A method as defined by claim 7, characterized in that the basic communication key (CX) recorded in the security module (MST1) of the central unit is transmitted in encoded form (CXc) from the loading module (MCH) to the security module of the central unit, the encoding of this communication key using an encoding algorithm contained in the loading module and introducing both the basic key (CX) contained in the loading module and the first diversified transport key (CTd1) calculated in the loading module, the diversified communication key (CXd) to be recorded in the security module (MST1) of the terminal being transmitted from the loading module (MCH) to the security module of the terminal, in a diversified and encoded form (CXdc), the diversification (CXd) of this key using a diversification algorithm from the loading module introducing both the basic communication key (CX) contained in the loading module and diversification data originating in the security module of the terminal (MST1), the encoding of this diversified communication key (CXdc) using an encoding algorithm that introduces both the diversified communication key (CXd), and a second diversified transport key (CTd2) obtained by a diversification algorithm that is contained in the loading module and introduces both the basic key (CT) of this second transport key contained in the loading module (MCH)

and diversification data originating in the security module (MST1) of the terminal.

9. A method as defined by claim 8, characterized in that the diversification algorithm contained in the security module (MSC1) of the central unit for diversification (CPd) of an implementation key to be transmitted to the user card introduces both the basic key (CP) of this implementation key, contained in this security module, and diversification data originating in the user card, the encoding of the diversified implementation key (CPdc) being obtained by an algorithm, contained in the security module of the central unit, that introduces both the diversified implementation key (CPd) and a diversified opening key (COd) which is recorded in the user card and is calculated in the security module of the central unit by a diversification algorithm that introduces both a basic key (CO) of this opening key, recorded in the security module of the central unit, and diversification originating in the user card.

10. A method as defined by claim 9, characterized in that the basic opening key (CO) recorded in the security module of the central unit is transmitted in encoded form (COc) by the loading module, the encoding of this basic key being obtained by an encoding algorithm contained in the loading module, and using said first diversified transport key (CTd1).

11. A method according to claim 10, characterized in that the diversified opening key (COd) recorded in the user card is transmitted to the user card in encoded form (COdc) by the security module (MSC1) of the central unit, the encoding of this diversified opening key using an encoding algorithm contained in the security module of the central unit and introducing both this diversified opening key (COd) and a diversified fabrication key (CFd) prerecorded in the card and calculated by the security module (MSC1) based on a basic fabrication key (CF).

12. A method according to claim 11, characterized in that the basic key (CF) of the diversified fabrication keys prerecorded in the user cards is transmitted to the security module (MSC1) of the central unit in encoded form (CFc), the loading module containing an encoding algorithm introducing both this basic key (CF) of the prerecorded diversified keys and the first transport key (CTd1) calculated by the loading module and present in this security module (MSC1) of the central unit.

13. A method as defined by claim 6 characterized in that the first and second diversified transport keys are recorded in the security module (MSC1) of the central unit and in the security module (MST1) of the terminal, respectively.

14. A method as defined by claim 8 characterized in that the first and second diversified transport keys are recorded in the security module (MSC1) of the central unit and in the security module (MST1) of the terminal, respectively.

15. A method as defined by claim 10 characterized in that the first and second diversified transport keys are recorded in the security module (MSC1) of the central unit and in the security module (MST1) of the terminal, respectively.

16. A network comprising a central unit (C1) and at least one terminal (T1), each including at least one security module (MSC1, MST1), characterized in that prior to the emplacement of the security modules of the network, a predetermined diversified transport key, corresponding to a loading module, is recorded into each security module of the network.

17. A network as defined by claim 16, characterized in that said network is so constructed and arranged so as to operatively cooperate with user cards (U1), in each of which at least one diversified opening key (COd) has been recorded prior to putting the card into service.

* * * * *